United States Patent
Little et al.

(10) Patent No.: US 9,210,156 B1
(45) Date of Patent: Dec. 8, 2015

(54) SYSTEMS AND METHODS FOR MULTI-STAGE IDENTITY AUTHENTICATION

(71) Applicant: LexisNexis Risk Solutions Inc., Alpharetta, GA (US)

(72) Inventors: Kimberly Little, Alpharetta, GA (US); Minoti Amin, Fremont, CA (US)

(73) Assignee: LEXISNEXIS RISK SOLUTIONS INC., Alpharetta, GA (US)

( * ) Notice: Subject to any disclaimer, the term of this patent is extended or adjusted under 35 U.S.C. 154(b) by 0 days.

(21) Appl. No.: 14/305,405

(22) Filed: Jun. 16, 2014

(51) Int. Cl.
| G06F 21/00 | (2013.01) |
| H04L 29/06 | (2006.01) |
| G06F 21/31 | (2013.01) |
| G06F 21/32 | (2013.01) |
| G06F 21/34 | (2013.01) |
| H04W 12/06 | (2009.01) |
| H04W 12/12 | (2009.01) |
| G06F 21/30 | (2013.01) |

(52) U.S. Cl.
CPC ............. *H04L 63/08* (2013.01); *G06F 21/30* (2013.01); *G06F 21/31* (2013.01); *G06F 21/32* (2013.01); *G06F 21/34* (2013.01); *H04L 63/0838* (2013.01); *H04L 63/0853* (2013.01); *H04L 63/0861* (2013.01); *H04W 12/06* (2013.01); *H04W 12/12* (2013.01); *H04L 63/0884* (2013.01)

(58) Field of Classification Search
CPC ......... G06F 21/30; G06F 21/31; G06F 21/32; G06F 21/34; H04L 63/0853; H04L 63/0884
See application file for complete search history.

(56) References Cited

U.S. PATENT DOCUMENTS

| 2008/0162338 A1 | 7/2008 | Samuels et al. |
| 2008/0249947 A1 | 10/2008 | Potter |
| 2009/0006230 A1* | 1/2009 | Lyda et al. ............... 705/35 |
| 2013/0225129 A1 | 8/2013 | Norbisrath |

FOREIGN PATENT DOCUMENTS

WO 2012001697 A1 1/2012

OTHER PUBLICATIONS

International Search Report and Written Opinion for counterpart International Application No. PCT/US15/31314 mailed Aug. 18, 2015.

* cited by examiner

*Primary Examiner* — Edward Zee
(74) *Attorney, Agent, or Firm* — Troutman Sanders LLP; Ryan A. Schneider; Mark Lehi Jones

(57) ABSTRACT

Certain implementations of the disclosed technology may include systems and methods for multi-stage identity authentication. A method is provided that includes receiving a set of identity information associated with a subject and querying one or more public or private databases with at least a portion of the set of identity information. The method includes receiving independent information responsive to the querying. The method includes determining zero or more first indicators of fraud risk and producing one or more identity proofing queries derived from the independent information. Based at least in part on a comparison of the one or more proofing queries and a query response, the method includes determining zero or more second indicators of fraud risk and evaluating a fraud score. Responsive to evaluating the fraud score, the method includes initiating one or more of authentication enrollment and multi-factor authentication of the subject.

20 Claims, 7 Drawing Sheets

Subject Data Input

| Subject Data Input | Authentication | Results |

Step 1 - Enter subject information. Last 4 SSN, First Name, Last Name, Date of Birth(MM/DD/YYYY)

Language: English

- Reference: ⟶ 402
- *Last 4 SSN: ⟶ 404
- *First Name: ⟶ 406
- *Last Name: ⟶ 408
- Street:
- Zip: ⟶ 410
- City:
- State: ⟶ 412
- *Date of Birth(MM/DD/YYYY):

[Submit] [Reset]

FIG. 4

Authentication

Subject Data Input | Authentication | Results

Step 2 - Select the correct response for each question.

Subject: Last Name, First Name

1) Which of the following STREETS have you NEVER lived or used as your address?
- W ALDINE AVE
- YORKSHIRE DR
- LARCOM CIR W
- AMBAR PL
- ALL OF THE ABOVE

← 502

2) Which of the following is/was your PHONE NUMBER?
- 792-4075
- 844-4310
- 669-9936
- 878-9199
- NONE OF THE ABOVE

← 504

3) What YEAR was the house located at 5331 RADELE CT built?
- 1950
- 1940
- 1945
- 1960
- NONE OF THE ABOVE

← 505

Submit    Cancel   End

FIG. 5

Results

| Subject Data Input | Authentication | Results |

Step 3 - View summary of Identity and Authentication results.

Subject: Last Name, First Name

Identity Verification: N/A  ID 1  N/A
Identity Authentication: Passed  ID 2  546137782
Quiz # 1: Passed Continue to: Multifactor Authentication

Transaction Header
Transaction #: 11010.f8d4b6da79eb2a012eb5208a594cdd738ad
Timestamp: 6/07/2013 17:06:53 EDT

[Continue]  [Return to Input]

FIG. 6

SYSTEMS AND METHODS FOR MULTI-STAGE IDENTITY AUTHENTICATION

FIELD OF THE DISCLOSED TECHNOLOGY

This disclosed technology generally relates to identity authentication, and in particular, to multi-stage identity authentication.

BACKGROUND OF THE DISCLOSED TECHNOLOGY

Many businesses and/or governmental agencies have a need to authenticate identities of potential clients and/or customers to avoid providing benefits or services to perpetrators of identity-related fraud. The United States Internal Revenue Service, for example, reported that over a million tax returns were identified as fraudulent for 2011, and a significant number of these tax returns involved identity theft.

Identity fraud continues to present difficult challenges for today's financial institutions, as many lenders unknowingly open credit accounts based on applications having synthetic, stolen or manipulated identity information. Technically well-informed fraud perpetrators with sophisticated deception schemes are likely to continue targeting governmental and financial institutions, particularly if fraud detection and prevention mechanisms are not in place. Balancing the threats of identity fraud with efficient service for legitimate clients presents significant challenges for identity authentication technologies.

Privacy and security of personal or propriety records and access to databases or remote services have become more reliant on increasing strengths of authentication methods; however, the relative strength of authentication is highly dependent on correctly identifying the identity of the individual(s) to whom the authentication method has been assigned.

Traditional identification methods have relied on the use of an account number, email address or phone number without stronger processes to identify fraudulent or high risk indicators in combination with proofing or verifying the identity of the individual(s). Tightly coupling strong methods of fraud decisioning and verification with the enrollment or use of the authentication method(s) will aid in the privacy and security challenges of in-person or remote authentication.

BRIEF SUMMARY OF THE DISCLOSED TECHNOLOGY

Some or all of the above needs may be addressed by certain implementations of the disclosed technology. Systems and methods are disclosed herein for implementing multi-stage identity authentication.

In an example implementation, a computer-implemented method is provided that includes receiving a set of identity information associated with a subject; querying one or more public or private databases with at least a portion of the set of identity information; receiving, in response to the querying, independent information; determining, with one or more computer processors, and based at least in part on a comparison of the independent information with at least a portion of the set of identity information, zero or more first indicators of fraud risk. The method includes producing, with the one or more computer processors, and responsive to the determining of the zero or more first indicators of fraud risk, one or more identity proofing queries, wherein at least a portion of the one or more identity proofing queries is based on personally identifiable information derived from the independent information; receiving, in response to sending the one or more identity proofing queries, at least one query response; determining, with the one or more computer processors, and based at least in part on a comparison of the one or more proofing queries and the at least one query response, zero or more second indicators of fraud risk; evaluating a fraud score, based at least in part on zero or more of the first or second indicator of fraud risk; and responsive to evaluating the fraud score, initiating enrollment and/or further authentication of the subject.

According to another example implementation, a system is provided. The system can include at least one memory for storing data and computer-executable instructions; and at least one processor configured to access the at least one memory and further configured to execute the computer-executable instructions to: receive a set of identity information associated with a subject; query one or more public or private databases with at least a portion of the set of identity information; receive, in response to the querying, independent information; determine, with the at least one processor, and based at least in part on a comparison of the independent information with at least a portion of the set of identity information, zero or more first indicators of fraud risk; responsive to the determining of the zero or more first indicators of fraud risk, produce, with the at least one processor, one or more identity proofing queries, wherein at least a portion of the one or more identity proofing queries is based on identity information derived from the independent information; receive, in response to sending the one or more identity proofing queries, at least one query response; determine, with the at least one processor, and based at least in part on a comparison of the one or more proofing queries and the at least one query response, zero or more second indicators of fraud risk; evaluate a fraud score, based at least in part on zero or more of the first and second indicators of fraud risk; and responsive to evaluating the fraud score, initiate enrollment and/or further authentication of the subject According to another example implementation, computer readable media is provided. The computer readable media may include computer-executable instructions that, when executed by one or more processors, cause the one or more processors to perform a method comprising: receiving a set of identity information associated with a subject; querying one or more public or private databases with at least a portion of the set of identity information; receiving, in response to the querying, independent information; determining, with one or more computer processors, and based at least in part on a comparison of the independent information with at least a portion of the set of identity information, zero or more first indicators of fraud risk; responsive to the determining of the zero or more first indicators of fraud risk, producing, with the one or more computer processors, one or more identity proofing queries, wherein at least a portion of the one or more identity proofing queries is based on identity information derived from the independent information; receiving, in response to sending the one or more identity proofing queries, at least one query response; determine, with the one or more computer processors, and based at least in part on a comparison of the one or more proofing queries and the at least one query response, zero or more second indicators of fraud risk; evaluating a fraud score, based at least in part on zero or more of the first and second indicators of fraud risk; and responsive to evaluating the fraud score, initiating enrollment and/or further authentication of the subject Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 4 depicts an example data input graphical user interface 400, according to an example implementation of the disclosed technology.

FIG. 5 depicts an example authentication graphical user interface 500, according to an example implementation of the disclosed technology.

FIG. 6 depicts an example authentication results graphical user interface 600, according to an example implementation of the disclosed technology.

DETAILED DESCRIPTION

Figure 1:
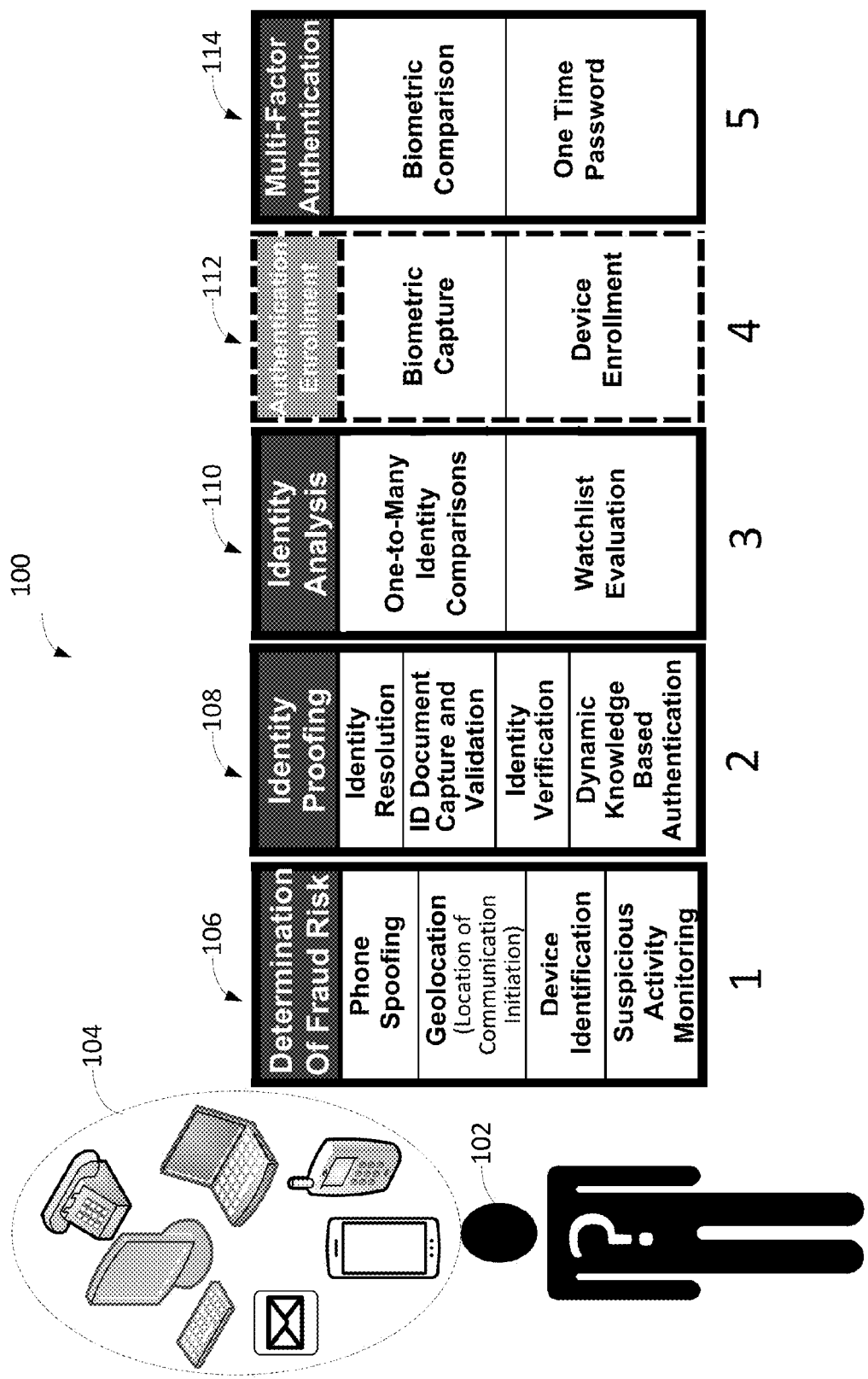
FIG. 1 is a block diagram of an illustrative multi-stage identity authentication process 100 according to an example implementation of the disclosed technology.

Implementations of the disclosed technology will be described more fully hereinafter with reference to the accompanying drawings, in which various embodiments of the disclosed technology are depicted. This disclosed technology may, however, be embodied in many different forms and should not be construed as limited to the implementations set forth herein; rather, these implementations are provided so that this disclosure will be thorough and complete, and will fully convey the scope of the disclosed technology to those skilled in the art.

Certain example implementations of the disclosed technology may enable effective determination and management of identity fraud risk. Certain implementations may be utilized to detect suspicious and/or fraudulent activities associated with the process of establishing a new account. For example, a subject seeking to establish a new account (such as a credit account, banking account, utility account, etc.) or apply for a benefit or service (such as a tax refund, etc.) may provide a basic set of identity information such as a name, address, telephone number, social security number, etc. In an example implementation, all or part of the set of identity information may be utilized to query one or more public and/or private databases to obtain independent information. In certain example implementations, the independent information may be processed to determine/detect/score first indicators of risk. The various process steps, as described above, may comprise an initial stage of a multi-stage risk assessment process. In certain example implementations, if the scores associated with the initial indicators of risk are below a certain threshold (indicating low risk) then the subject may proceed to a subsequent stage.

In an example implementation, a second stage of the multi-stage risk assessment can include producing one or more proofing queries for the subject to answer. In certain example implementations, the one or more proofing queries can include personally identifiable information derived from the independent information. For example, personally identifiable information can include information that is likely to be known by an authentic subject, but may be unknown to an impersonator or perpetrator of identity fraud. Certain example implementations of the disclosed technology may receive the subject's response to the one or more proofing queries and determine/detect/evaluate/score, as applicable, second indicators of fraud risk. This stage of the multi-stage risk assessment may include evaluating and/or outputting a fraud score, for example, based on the first and/or second indicators of fraud risk. In certain example implementations, the score may be based on a comparison of the query response and the independent information obtained from the public and/or private databases.

Certain example implementations of the disclosed technology may utilize the stages described above to halt or continue a process of further authentication based on the determined fraud risk. In certain example implementations, the risk assessment process, as disclosed herein, may be used to prevent initiation of a third stage when fraud risk is determined to be above a certain level. In an example implementation, the third stage can include biometric capture associations (and/or other strong authentication associations) with subject and/or account information. It may be recognized by those of skill in the art that a biometric signature should be associated with a subject only after a subject's identity is adequately authenticated, for example, to reduce or prevent identity fraud.

According to an example implementation of the disclosed technology, account applicants who fail the first stage may not be allowed to proceed directly to the second stage of the multi-stage authentication process. Similarly, in certain embodiments, account applicants who pass the first stage, but fail the second stage, may not receive an account number and/or password, and may not proceed directly to the third stage of the authentication process.

Certain example embodiments of the disclosed technology may allow for offline, manual, and/or custom validation of a subject's identity when the subject fails one or more of the authentication stages. For example, certain legitimate subjects may score high for fraud risk (i.e., false positive) due to various factors. For example, a widow who has always relied on her previously deceased husband for opening credit accounts, etc., may have little or no public or private records available for obtaining independent information. Similarly, a teenager or immigrant without any prior job or banking records who wishes to open an account may be flagged as high risk. In these situations, it may be possible to obtain the appropriate authentication by offline, manual, and/or custom validation. For example, in one implementation, a subject who fails one of the stages may be asked to provide additional proof of their identity. In another example implementation, a subject who fails one of the stages may be asked to appear in person at a vendor location for further questioning and/or documentation.

Certain embodiments utilize non-fair credit reporting act (non-FCRA) implementations, for example, so if a subject fails one or more stages, such information will not be utilized for denying employment, credit, etc. In such situations, a vendor for which the subject is seeking authentication may provide other offline, manual, and/or custom validation options. However, if the subject passes the appropriate stages, then the process may be utilized to initiate the biometric authentication or strong authentication stage. Furthermore, if the subject passes the appropriate stages, certain implementations of the disclosed technology may provide an efficient means for identity authentication.

Certain example implementations may identify specific types of possible identity fraud and risk levels associated with a subject. For example, personal information submitted with an application may be analyzed with respect to available information in public and/or non-public records to determine the authenticity of the subject's identity and/or the applicant data. According to certain implementations, the analysis may involve comparisons on multiple levels using models specific to the type of risk identified. According to certain implementations, the analysis may further identify discrepancies (if any), categorize the type of possible fraud, score the risk of fraud, and/or further evaluate the application information based on the type of risk.

Certain example implementations of the disclosed technology may utilize a one-time password (OTP). The OTP can refer to a password that can be used by a subject to authenticate an account or service. In one example implementation, a subject may only use the OTP a single time so that future access to the account cannot be gained by use of the same OTP. In certain example implementations, the OTP can be set to expire within a predetermined period. In an example implementation, the OTP may be utilized to authenticate a service or account. For example, a subject may be asked to provide the OTP to access a service, or when a specific transaction is performed. Examples of use cases where the OTP may be utilized includes online banking services, a telephone banking service, an interactive voice response (IVR) banking service, a credit card service, a bill payment service, or any other service in which a subject is able to provide and/or receive sensitive information.

In certain example implementations, the OTPs generated by the multi-stage authentication system can take on various forms. For example, in one implementation, the OTPs may be six characters in length and may include only numeric characters. Alternatively, in another implementation, each of the OTPs may be eight characters in length and may include case sensitive alphanumeric characters. In an example implementation, a first OTP may include five numeric characters, a second OTP may include four alphabetical characters, a third OTP may include seven alphanumeric characters, a fourth OTP may include five symbols, and so on. In certain example implementations, the OTPs can include any other number of characters and/or can include any combination of letters, numerals, and symbols.

Certain example implementations of the disclosed technology may utilize a multi-factor authentication (MFA) for authentication. MFA can refer to combining two or more authentication techniques together to form a more reliable level of authentication. Authentication techniques generally fall into one of three categories: what a user knows, what a user has, and what a user is. Using what a user knows for authentication is often referred to as knowledge-based authentication (KBA) since the authentication requires knowledge possessed by the user such as an answer to a question, a username, and/or a password. What a user has may refer to a card, a one-time password generating device, or other object/information which may be provided to the subject for use during authentication. What a user is refers to the use of biometric information such as a fingerprint to authenticate the user.

Various systems and methods may be utilized for the process of multi-stage authentication, according to example implementations of the disclosed technology, and will now be described with reference to the accompanying figures.

FIG. 1 depicts a multi-stage identity authentication process 100 according to an example implementation of the disclosed technology. Certain example implementations of the process 100 may allow authentication enrollment 112 and/or further multi-factor authentication 114 after evaluating fraud risks and after adequately authenticating the identity of the subject 102. In certain example implementations, biometric signature associations with a subject 102 may be performed after evaluating fraud risks and after adequately authenticating the identity of the subject. According to an example implementation, the subject 102 may interface with and/or provide basic identity information for initiating the multi-stage identity authentication process 100 using various communication channels 104. For example, in certain embodiments, the subject 102 may provide the basic identity information via a standard communication channel 104, including but not limited to a telephone, computer, smart-phone, laptop, tablet, paper application, mail, etc. In one example implementation, (and as will be discussed below with reference to FIG. 4 and FIG. 5), the basic identity information and/or subsequent authentication answers may be input directly into one or more webpage forms for online processing.

In certain example implementations, the multi-stage identity authentication process 100 may include a first stage 106 for determination and/or scoring of fraud risk. In certain example implementations, the first stage 106 may include receiving a set of identity information associated with the subject 102. For example, in one implementation, the set of identity information may include basic details, such as a name, address, date of birth, social security number, location, etc. In certain example implementations, all or part of the set of identity information may be utilized to obtain independent information, for example, by querying one or more public or private databases with at least a portion of the set of identity information. According to an example implementation, the independent information may be analyzed to determine zero or more first indicators of fraud risk.

In an example implementation, the received set of identity information may also include information that may directly or indirectly identify certain characteristics about the communication channel or device 104 used by the subject 102, such as a phone number, IP address, MAC address, location, signal-to-noise, unique browser configuration, operating system, installed fonts, installed plug-ins, etc. In an example implementation, the characteristics about the communication channel or device 104 may be utilized in conjunction with the basic details received from the subject 102 to determine one or more of:
  if the received phone number associated with the communication channel or device 104 differs or is altered in some way from the originating device phone number (i.e. spoofed);
  if the subject's 102 communication device 104 is located where it would be expected to be (i.e., within the home city or state of the subject 102);
  if the subject's 102 communication device 104 is located in a region associated with a high crime rate;
  if the subject's 102 communication device 104 is located in foreign country;
  details about the subject's 102 communication device 104 (i.e., device identification and/or fingerprinting) that may be corroborated by independent information.

According to an example implementation of the disclosed technology, the information gathered in the first stage 106 may be analyzed, compared, etc., to determine and/or prepare a first stage 106 fraud risk score. In an example implementation, if the first stage 106 fraud risk score is determined to exceed a threshold (i.e., to be more risky than acceptable), the process 100 may prevent or block additional authentication via the subsequent stages 108, 110, 112, 114 and an indication of failure may be output. For example, in situations where the risk is determined to be higher than acceptable, the subject 102 may be presented with other options or instructions to validate his or her identity.

In an example implementation, if the first stage 106 fraud risk score is determined to be acceptable, then the process may proceed to the second stage 108. Certain embodiments of the second stage 108 may include producing one or more identity proofing queries, for example, based on the independent information received from the public and/or private databases. As will be discussed below with reference to FIG. 5, the identity proofing queries may include questions for the subject 102 to answer. In certain example implementations, the proofing queries may include knowledge-based authentication (KBA) questions for the subject 102 to answer. In certain example implementations, the proofing queries may include one or more multiple-choice questions that have associated "correct" answers based on the independent information. In certain embodiments, the proofing queries may be derived from personally identifiable information that could be answered correctly by a legitimate subject 102, but that may require guessing by a fraudulent subject 102.

In certain example implementations, the second stage 108 of the identity authentication process 100 may include collecting answers to the proofing queries and determining, with the one or more computer processors, zero or more second indicators of fraud risk. In an example implementation, the zero or more second indicators of fraud may be based on a comparison of the answers to the proofing queries with at least a portion of the independent information. Certain example implementations of the disclosed technology may include capture of identification documents (such as a driver's license, social security card, credit card, bank card, utility bill, tax return, etc.,) for further identity verification.

In accordance with an example implementation, the second stage 108 of the identity authentication process 100 may utilize all or part of the previously gathered, compared, analyzed, and/or scored information (including that from the first stage 106) to determine a second stage 108 fraud risk score. It may be recognized by those of skill in art that the second stage 108 fraud risk score may provide additional confidence compared with the first stage 106 fraud risk score, particularly since personally identifiable information (such as answers to KBA questions) may be used for the additional identity proofing.

In accordance with an example implementation, and responsive to evaluating the second stage 108 fraud risk score, an identity/fraud evaluation 110 may be provided in a similar fashion to that discussed with respect to the first stage 106. For example, the information gathered in the first stage 106 and/or the second stage 108 may be and analyzed, compared, etc., to determine and/or calculate a second stage 108 fraud risk score. In an example implementation, if the second stage 108 fraud risk score is determined to be greater than acceptable, the process 100 may stop and an indication of failure may be output. For example, the indication of failure (or success) may be handled via the identity/fraud evaluation 110 step. As discussed above, if the second stage 108 fraud risk score is unacceptable, the subject 102 may be informed that the authentication process 100 failed, and the subject 102 may be presented with other off-line options to validate his or her identity.

In an example implementation, if the second stage 108 fraud risk score is determined to be acceptable, then the process 100 may proceed to an identity analysis stage 110, where for example, previously obtained information about the subject 102 may be utilized to search one or more databases in one-to-many identity comparisons, for example, to further provide confidence that the subject is unique, and not associated with another identity. In some example embodiments, the identity analysis may include checking a watchlist. For example, one or more watchlists (such as a Do Not Pay list associated with tax returns) may be queried with a combination of entity-supplied information and independent information obtained from one or more public records. For example, a person may be listed on a watchlist for a number of reasons, including being incarcerated, not paying child support, having liens, having a record of identity-related crimes, etc. Subjects who are on a watchlist, for example may supply an incorrect social security number or a slight misspelling of a name to avoid being matched with the information on the watchlist.

According to certain exemplary embodiments, the watchlist may be queried with one or more combinations of the entity-supplied name and entity-supplied social security number, the entity-supplied name and the second social security number, the second name or name variant and the entity supplied social security number, the second name or name variant and the second social security number, etc. According to exemplary embodiments, if one of the combinations matches the information on the watch, then a fraud alert may be output.

In an example implementation, if the outcome of the third stage 110 is determined to be acceptable, then the process 100 may proceed to an authentication enrollment stage 112, where for example, the authenticated subject 102 may submit to biometric capture and/or enroll their device(s) 104. In certain example implementations, the authenticated subject 102 may register a username and password in the authentication enrollment stage 112.

According to an example implementation of the disclosed technology, once the preceding stages are determined be acceptable, and once the subject has been properly authenticated, enrolled, and/or associated with account information, the multi-factor authentication stage 114 of the process may proceed without requiring a repeat of the preceding stages.

In certain example implementations, the multi-factor authentication stage 114 may include a biometric comparison to verify that the authenticated subject's biometric information on file matches newly submitted biometric capture by a subject 102. For example, in certain example implementations, biometric capture may be used to associate the subject 102 identity information with some type of physically verifiable (biometric) information, such as a fingerprint, a voice print, an iris image, a facial image, etc.

In certain example implementations, the multi-factor authentication stage 114 may include the use of a one-time password OTP, which can refer to a password that can be used by a subject to authenticate an account or service. In one example implementation, a subject may only use the OTP a single time so that future access to the account cannot be gained by use of the same OTP. In certain example implementations, the OTP can be set to expire within a predetermined period. In an example implementation, the OTP may be utilized to authenticate a service or account. For example, a subject may be asked to provide the OTP to access a service, or when a specific transaction is performed. Examples of use cases where the OTP may be utilized includes online banking services, a telephone banking service, an interactive voice response (IVR) banking service, a credit card service, a bill payment service, or any other service in which a subject is able to provide and/or receive sensitive information.

In certain example implementations, the OTPs generated by the authentication system can take on various forms. For example, in one implementation, the OTPs may be six characters in length and may include only numeric characters. Alternatively, in another implementation, each of the OTPs may be eight characters in length and may include case sensitive alphanumeric characters. In an example implementation, a first OTP may include five numeric characters, a second OTP may include four alphabetical characters, a third OTP may include seven alphanumeric characters, a fourth OTP may include five symbols, and so on. In certain example implementations, the OTPs can include any other number of characters and/or can include any combination of letters, numerals, and symbols.

According to an example implementation of the disclosed technology, messages associated with the OTP may be sent to a subject using various so-called "out-of-band" communication channels or combinations of channels such as by phone, email, physical mail, SMS messaging, URL access, etc. For example, in one implementation, an OTP message or instructions on how to use a OTP may be sent to a subject using one communication channel (such as via a browser on a desktop computer) while the OTP codes may be sent or presented to the subject using another communication channel or device (such as via a text message on a smart phone). Such multi-channel/device communications may provide a "possession" factor for security in an authentication process.

In certain example implementations, once the subject completes certain authentication stages with satisfactory risk scores, future access to the subject's 102 account may be granted based on the biometric or OTP information without having to repeat the entire authentication process 100. In certain example implementations, additional verification and/or identity proofing 108 may be triggered before granting access to an account. For example, if a subject 102 has previously passed all of the stages, but attempts to access their account from a different or unknown device or communications channel 104, one or more of the previously described stages 106-114 may be repeated. In certain example embodiments, periodic identity proofing questions, one time passwords, multi-factor authorization, etc., may be presented to the subject 102 for completion before access to the account or service is granted.

Figure 2:
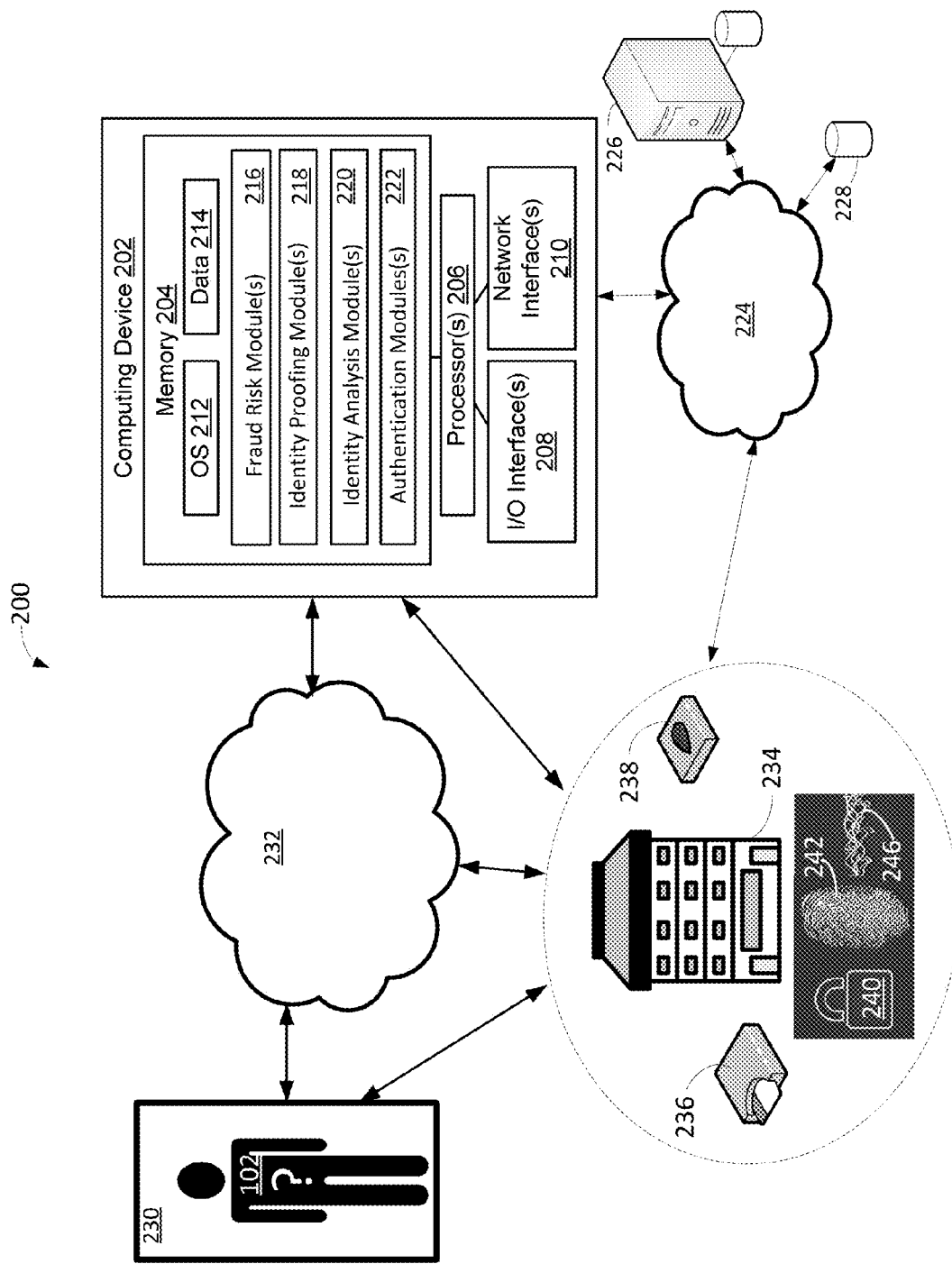
FIG. 2 is a block diagram of an example system 200 for implementing a multi-stage identity authentication process according to an example implementation of the disclosed technology.

FIG. 2 is a block diagram of an example system 200 for implementing a multi-stage identity authentication process, according to an example implementation of the disclosed technology. The system 200 may utilize a computing device 202 for handling various aspects of the process, including communicating with the various entities and/or external systems involved in the authentication process. For example, the computing device 202 may communicate via one or more cloud, Internet, or other network channels 224 230 to send and/or receive information. For example, the computing device 202 may receive identity information 230 related to the subject 102. Such identity information 230 may include a basic set of identity information received from the subject 102 (for example, to initiate the authentication process) as well as independent information received in response to querying one or more public or private databases 226 228.

In certain example implantations, the computing device may include one or more input/output interfaces 208 and/or network interfaces 210 for communicating with the various systems and/or entities in the authentication process. According to an example implementation of the disclosed technology, the computing device 202 may be in communication with clients or vendors 234, either directly, or via a cloud, Internet, or other network channel 224 230. For example, a subject 102 seeking to open an account or to do business with a particular vendor 234 may need to go through an authorization process dictated by the vendor 234, where one or more authentication steps are handled by the system 200.

In certain example implementations, the computing device 202 may be utilized to initiate authentication and/or receive information from various devices, including but not limited to card readers 236, fingerprint scanners 238, text input devices, cameras, microphones, etc. In certain example implementations of the disclosed technology, the computing device may receive information such as passcodes 240, authentication query responses, and/or data representative of biometric information (such as fingerprint 242 or voiceprint 246 information).

In an example implementation, the computing device 202 may include memory 204 in communication with one or more processors 206. The memory 204 may be configured to host an operating system 212 and data 214. Certain example implementations of the disclosed technology may include various modules 216 218 220 222 for processing the various stages of the authentication process. For example, the memory 204 may include one or more fraud risk modules 216 for determining initial fraud risk (such as described above with reference to FIG. 1 and the first stage 106 fraud risk determination). In an example implementation, the memory 204 may include one or more identity proofing modules 218 for handling identity proofing (such as described above with reference to FIG. 1 and the second stage 108 identity proofing). In certain example implementations of the disclosed technology, the memory 204 may include one or more identity analysis modules 220 to handle, for example, evaluate and score identity fraud (such as described above with reference to FIG. 1 and the evaluation stage 110). In certain example implementations, the identity analysis module 220 may process, compare, weight, score, etc. the various risk factors associated with authenticating a subject 102. According to an example implementation of the disclosed technology, the computing device 202 may be configured with one or more authentication modules 222. In one example implementation, the authentication module(s) 222 may be utilized to handle biometric capture. In another example implementation, the authentication module(s) 222 may be used for authentication enrollment and/or multi-factor authentication (such as described above with reference to FIG. 1 and the authentication enrollment 114 step and the multi-factor authentication 114 step associated with the final stage of the authentication process 100).

Figure 3:
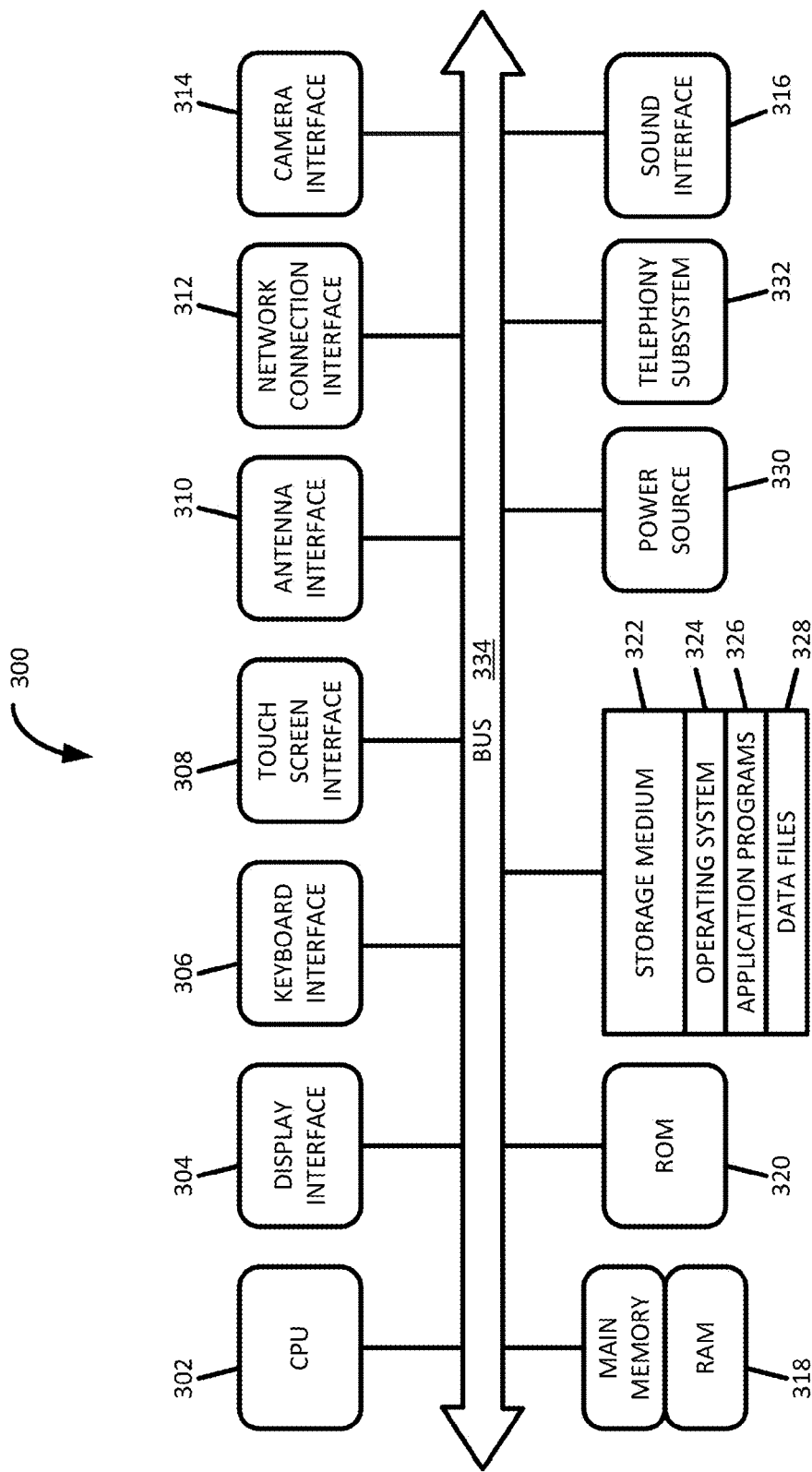
FIG. 3 is a block diagram of a computing device 300, according to an example implementation of the disclosed technology.

FIG. 3 is a block diagram of an illustrative computing device 300, according to an example implementation of the disclosed technology. In certain example implementations, the computing device 300 may be embodied as the computing device 202, as shown in FIG. 2. The computing device 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display that is not necessarily physically connected to the computing device. For example, a desktop monitor may be utilized for mirroring graphics and other information that is presented on the computing device 300. In certain example implementations, the display interface 304 may wirelessly communicate, for example, via a Wi-Fi channel or other available network connection interface 312 to an external/remote display.

In an example implementation, the network connection interface 312 may be configured as a communication interface, for example, to provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 300 may include a keyboard interface 306 that provides a communication interface to a keyboard. In one example implementation, the computing device 300 may include a pointing device and/or touch screen interface 308. According to certain example implementations of the disclosed technology, the pointing device and/or touch screen interface 308 may provide a communication interface to various devices such as a pointing device, a touch screen, a depth camera, etc. which may or may not be associated with a display.

The computing device 300 may be configured to use an input device via one or more of input/output interfaces (for example, the keyboard interface 306, the display interface 304, the touch screen interface 308, network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor such as an accelerometer or gyroscope, a smartcard, iris reader, fingerprint reader, voiceprint reader, and the like. Additionally, the input device may be integrated with the computing device 300 or may be a separate device.

Example implementations of the computing device 300 may include an antenna interface 310 that provides a communication interface to an antenna; a network connection interface 312 that provides a communication interface to a network. In certain implementations, a camera interface 314 is provided for capturing digital images, for example, from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, an invoice extraction module, etc.) and data files 328 are stored. According to an example implementation, the computing device 300 includes a power source 330 that provides an appropriate alternating current (AC) or direct current (DC) to power components. According to an example implementation, the computing device 300 may include and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like (such as the modules 216-222 as discussed with respect to FIG. 2), stored on removable and non-removable memory media, to off-load data from the device 300 or to upload data onto the device 300. A computer program product, such as one utilizing a communication system may be tangibly embodied in storage medium 322, which may comprise a machine-readable storage medium.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

FIG. 4 depicts an example data input graphical user interface 400, according to an example implementation of the disclosed technology. Certain example implementations of the disclosed technology may utilize the same or similar graphical user interfaces for receiving input related to authentication. For example, as discussed with reference to FIG. 1, the subject 102 may provide a basic set of identity information, and the graphical user interface 400 may provide a convenient input medium for obtaining the information. In certain example implementations, and as depicted by the * in some of the input fields 404 406 408 412 shown in FIG. 4, certain vendors may require basic information such as a portion of the subject's social security number 404, a first name 406, a last name 408, and a date of birth 412. According to an example implementation of the disclosed technology, the graphical user interface 400 may include fields for optional or additional information that may be utilized for further selectivity in identifying independent information about the subject. For example, the graphical user interface 400 may include a reference field 402. In an example implementation, the graphical user interface 400 may include input fields for the subject's residence or mailing address 410.

It will be recognized by those of skill in the art that the graphical user interface 400 may include more or less of the input fields illustrated in FIG. 4. For example, certain implementations may include subject data input field(s) for inputting a phone number. Certain implementation may include fields for inputting other subject data such as, but not limited to account numbers, dates, locations, relative names, relative addresses, etc. Certain example implementations may include vendor-specific custom fields for input.

FIG. 5 depicts an example authentication graphical user interface 500, according to an example implementation of the disclosed technology. As discussed with reference to FIG. 1, certain embodiments of the disclosed technology may include producing one or more identity proofing queries, for example, based on information derived from the independent information. In one example implementation, the identity proofing queries may include knowledge-based authentication (KBA) questions for the subject 102 to answer.

As shown in FIG. 5, the proofing queries may include one or more multiple-choice questions that have associated "correct" answers based on the independent information. In certain embodiments, the proofing queries may be derived from personally identifiable information that could be answered correctly by a legitimate subject, but that may require guessing by a fraudulent subject. For example, the authentication graphical user interface 500 may display a first question 502, such as, "Which of the following streets have you never lived or used as your address?" In response, a subject may select one or more of the corresponding multiple-choice answers. In an example implementation, the authentication graphical user interface 500 may display a second question 504, such as, "Which of the following is/was your phone number?" In response, a subject may select one or more of the corresponding multiple-choice answers. Similarly, in an example implementation, the authentication graphical user interface 500 may display a third question 506, such as, "What year was your house built?" In response, a subject may select one or more of the corresponding multiple-choice answers. Certain example implementations of the disclosed technology may utilize the selected responses to determine one or more risk factors, score the associated risks, and/or authenticate (or reject) a particular subject.

FIG. 6 depicts an example authentication results graphical user interface 600, according to an example implementation of the disclosed technology. In this example interface 600, results of an authentication stage may be presented upon completion of an authentication stage. For example, and as discussed above with reference to FIG. 1 and FIG. 2, the multi-stage identity authentication process disclosed herein may include a plurality of authentication stages, which may need to be successfully completed (with acceptable risk scores) before moving to subsequent stages. The example authentication results graphical user interface 600 depicts example output that may be presented to a subject upon successful completion of the identity authentication stage. Shown for example in FIG. 6 is a first output section 602 identifying the subject, the stage, and the results. In an example implementation, the example authentication results graphical user interface 600 may also provide an indication 604 as to the next stage of the authentication process.

Figure 7:
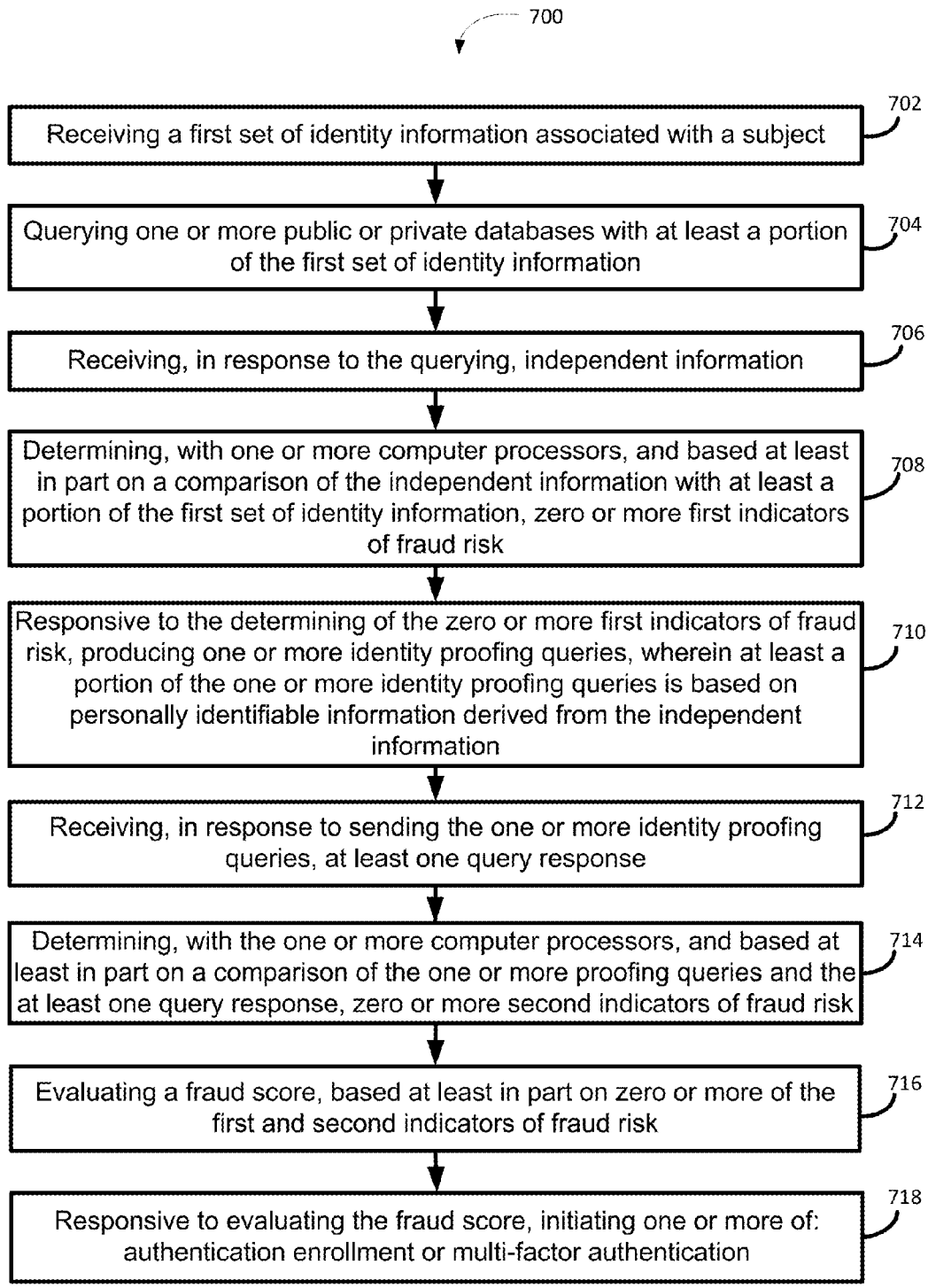
FIG. 7 is a flow diagram of a method 700, according to an example implementation of the disclosed technology.

FIG. 7 is a flow diagram of a method 700, according to an example implementation of the disclosed technology. The method 700 begins in block 702 and includes receiving a set of identity information associated with a subject. In block 704, the method 700 includes querying one or more public or private databases with at least a portion of the set of identity information. In block 706, the method 700 includes receiving, in response to the querying, independent information. In block 708, the method 700 includes determining, with one or more computer processors, and based at least in part on a comparison of the independent information with at least a portion of the set of identity information, zero or more first indicators of fraud risk. In block 710, and responsive to the determining of the zero or more first indicators of fraud risk, the method 700 includes producing, with the one or more computer processors, one or more identity proofing queries, wherein at least a portion of the one or more identity proofing queries is based on identity information derived from the independent information. In block 712, the method 700 includes receiving, in response to sending the one or more identity proofing queries, at least one query response. In block 714, the method 700 includes determining, with the one or more computer processors, and based at least in part on a comparison of the one or more proofing queries and the at least one query response, zero or more second indicators of fraud risk. In block 716, the method 700 includes evaluating a fraud score, based at least in part on zero or more of the first and second indicators of fraud risk. Responsive to evaluating the fraud score, and in block 718, the method 700 includes initiating one or more of authentication enrollment or multi-factor authentication of the subject.

According to an example implementation of the disclosed technology, receiving the set of identity information can include receiving, as applicable, one or more of: a phone number, an IP address, a location, and a communication device electronic fingerprint. According to an example implementation of the disclosed technology, receiving the set of identity information can include receiving, as applicable, one or more of: a name, an address, a birth date, a phone number, and at least portion of a social security number.

Certain embodiments of the disclosed technology can include outputting an indication of the fraud score. According to an example implementation of the disclosed technology, initiating one or more of authentication enrollment or multi-factor authentication of the subject can include initiating one or more of knowledge based authentication (KBA) and/or one-time passcode (OTP) authentication. Certain implementations can include capturing biometric information from the subject, including but not limited to one or more of fingerprint image capture, voiceprint audio capture, facial feature image capture, and iris image capture.

In certain example implementations of the disclosed technology, evaluating the fraud score can include differentiating between normal, low risk, and high fraud risk. According to an example implementation of the disclosed technology, evaluating the fraud score can include evaluating the set of identity information and the independent information for one or more of social security number validation, address validation, characteristics of the address, issuance characteristics of the social security number, correlation of the individual identity elements in one or more consumer identity data repositories, velocity of the appearance of the identity in account opening searches, divergence between identity elements in account opening searches, history of the identity in the one or more consumer identity data repositories, sources reporting the identity, associates and relatives of the identity, variation of the identity elements reported, and verification of application identity as an existing identity known from consumer identity data repositories.

According to certain example implementations, an initial and/or subsequent set of identity information may be received, processed, compared with various public and non-public information sources, and analyzed to authenticate the identity of a subject. Certain example implementations of the disclosed technology may help avoid rejecting a legitimate applicant who may normally be rejected based on a less comprehensive analysis. Certain implementations of the disclosed technology may utilize pattern recognition to improve identity fraud prevention.

According to certain example implementations of the disclosed technology, evaluating identity fraud risk may be based on independent information, for example: whether the identity information has previously been reported; whether the address on the application matches an address previously reported; whether the social security number on the application has been previously reported with a different identity; whether the identity has only been reported by credit bureau sources; whether the identity has been the subject of recent account opening inquiries; or whether the identity has a history of derogatory or high risk events. According to an example implementation, other additional independent information may be utilized without departing from the scope of the disclosed technology.

In certain example implementations, the independent information may include source records such as property deeds, credit bureau identity files, utility connects and disconnects, driver licenses, voter registrations, phone book directories, etc. Example implementations of the disclosed technology may aggregate and process such information to locate inconsistencies and/or patterns that may further identify certain types of identity fraud.

In an example implementation, a risk score, a risk type, and/or warning codes may be generated at one or more stages of the multi-stage identity authentication process. For example, the risk score may indicate a likelihood that an application or request for service will result in fraud if the account is opened. In one example but non-limiting implementation, the generated risk score may be a three digit numeric score ranging from 300-999. In one example implementation, a risk score of 999 may indicate the lowest likelihood of fraud and 300 may represent the highest likelihood of fraud. In other example implementations, the generated risk score may be normalized or transformed to span any convenient range.

According to an example implementation, a risk type may be generated and provided to indicate the (probable) type of fraud detected. For example, identity fraud in credit applications can be categorized into several distinct types, for example:

Stolen Identity: using someone else's identity to obtain credit or services;

Synthetic Identity: fabricating a fictitious identity in order to avoid responsibility for credit repayment;

Manipulated Identity: intentionally manipulating the record of one's real identity by using multiple social security numbers, address variations or name spellings;

Friendly Fraud: using a family member or roommate's identity in order to obtain goods or services;

High Risk Identity: individuals who have elevated risk of perpetrating fraud, for example, those with a record of broken contracts, felony convictions or lawlessness; and Vulnerable Victim: individuals with elevated risk of being the victim of fraud, for example, an underage minor or an elderly retiree.

According to certain example implementations, a risk index may be generated for each of the above risk types. For example, the risk index may indicate the likelihood that the corresponding risk type is associated with the subject and/or information received. These unique risk indicators may allow fraud prevention teams to improve operational efficiency by bypassing much of the research needed to determine the type of identity fraud being attempted. Example implementations may allow investigators and analysts to appropriately direct cases to the specialists that are best equipped to mitigate the suspected fraud activity or to execute actions that related to the risk condition. According to other example implementations, the risk index may be utilized to stop the process and automatically generate a list of additional identity proof requirements needed from the subject before the authentication is allowed to proceed further.

According to an example implementation, identity fraud risk scoring may be based on one or more of the following: a social security number (SSN) that has either been reported as associated with a deceased person; a SSN that was issued prior to the declared date-of-birth of the subject; a known subject identity based on a search of identity sources, but where the address presented has not previously been reported as a residential address for the subject; identity information that has not previously been reported by any identity source; identity information that has only been reported by credit bureau sources; identity information that has been reported by law enforcement sources and/or that may be considered derogatory; identities that have elevated recent account opening activity, etc.

According to example implementations, a custom fraud scoring model may be used for each type of fraud risk. Certain example scoring may be based on an empirical analysis of known frauds and non-frauds in a training dataset. Each scoring model may be optimized based on the specific characteristics present and may be designed to differentiate normal, low risk subjects from those having high fraud risk.

Table 1 below lists various ways in which the basic set of identity information and/or the retrieved independent information may be evaluated and categorized for determining identity fraud characteristics. According to example implementations, such identity characteristics may be utilized to categorize risk types, generate identity fraud risk types, and/or generate risk scores.

TABLE 1

| Fraud Characteristics | Description |
| --- | --- |
| The input SSN is reported as deceased | The input Social Security Number (SSN) reported as deceased by the Social Security Administration or various state death records. Any transaction with the input SSN reported as deceased may return an exception score. |

TABLE 1-continued

| Fraud Characteristics | Description |
| --- | --- |
| The input SSN was issued prior to the input Date of Birth | The input SSN high issue date is before the input date of birth. |
| The input Last Name and SSN are verified, but not with the input Address and Phone | The input SSN is associated with the input last name, the input phone is associated with the input address, but there is no association of the input name to the input address. |
| The input SSN is invalid | The input SSN has not been issued according to the Social Security Administration. |
| The input phone number may be disconnected | The input phone number was listed to the input address but is reported as being disconnected. |
| The input phone number is potentially invalid | Area code and phone exchange combination is invalid in the U.S. |
| The input phone number is a pager number | The input phone number is only provided pager service. |
| The input phone number is a mobile number | The input phone number is not a landline. |
| The input address may be invalid according to postal specifications | The input address was not verified and is not deliverable per the United States Postal Service. |
| The input zip code belongs to a post office box | The input zip code is a non-residential zip code for PO Box usage only. |
| The input address has an invalid apartment designation | The input address unit designation is not valid for that street address. |
| The input address is a transient or institutional address | The input address is associated with a non-residential institution such as a hotel, campground, warehouse, mail drop, transient business, or correctional facility. |
| The input phone number matches a transient or institutional address | The input phone number is listed to a non-residential institution such as a hotel, campground, warehouse, mail drop, transient business, or correctional facility. |
| The input phone number and input zip code combination is invalid | The input phone number is associated with a different geographical location than the input address. |
| Unable to verify name, address, SSN/TIN and phone | No more than one of the input identity elements are verified (Name, Address, SSN, and Phone) |
| Unable to verify applicant name, address and phone number | Verification failure of Name, Address, and Phone |
| Unable to verify applicant name and address | Verification failure of Name and Address |
| Unable to verify applicant name and SSN | Verification failure of Name and SSN |
| Unable to verify applicant address and SSN | Verification failure of Address and SSN |
| Unable to verify applicant address | Verification failure of input Address |
| Unable to verify SSN/TIN | Verification failure of input SSN |
| Unable to verify applicant phone number | Verification failure of input phone being associated with the input address |
| Unable to verify applicant date-of-birth | Verification failure of input date-of-birth |
| The input SSN/TIN may have been miskeyed | Close matching SSN was found (1 digit off or 2 digits transposed) |
| The input address may have been miskeyed | Close matching address found |
| The input phone number may have been miskeyed | Close matching phone found |
| Identity elements not fully verified on all available sources | The input identity elements were not verified on all available sources. |
| Unable to verify applicant name | Verification failure of input last name |
| The input driver's license number is invalid for the input DL state | The driver's license number is not a valid format for the designated state |
| The input SSN and address are not associated with the input last name and phone | SSN is associated with a different name at that address, name is verified from phone information |
| Unable to verify first name | Verification failure of input first name |
| The input phone and address are geographically distant (>10 miles) | The input phone is listed to an address more than 10 miles away |
| The input address matches a prison address | The input address matches a correctional facility address |

TABLE 1-continued

| Fraud Characteristics | Description |
|---|---|
| The input last name is not associated with the input SSN | The input SSN is associated with a different last name |
| The input first name is not associated with input SSN | The input SSN is associated with a different first name |
| The input SSN is not found in the public record | The input SSN cannot be found on any available source |
| The input SSN is associated with a different name and address | The input SSN is associated with a different subject at a different address |
| The input phone number is not found in the public record | The input phone cannot be found on any available source |
| The input phone number is associated with a different name and address | The input phone is listed to a different consumer at a different address than the input address |
| The input name was missing | The input name was missing |
| The input address was missing | The input address was missing |
| The input SSN/TIN was missing or incomplete | The input SSN was missing or incomplete |
| The input phone was missing or incomplete | The input phone was missing or incomplete |
| The input date-of-birth was missing or incomplete | The input date-of-birth was missing or incomplete |
| The input name and address return a different phone number | Input phone is different than phone in service at input address |
| The input date-of-birth may have been miskeyed | Close matching date of birth found |
| Security Freeze (CRA corrections database) | Applicant has placed a security freeze on their consumer file to prevent their data from being delivered in the event it is requested from a credit grantor. Any transactions subject to a security freeze can return an exception score. |
| Security Alert (CRA corrections database) | Applicant has requested a security alert be placed on their consumer file notifying any potential credit grantor of a possible identity theft. Any transactions subject to a security alert can return an exception score. |
| Identity Theft Alert (CRA corrections database) | Applicant has requested an identity theft alert be placed on their consumer file notifying any potential credit grantor of a possible identity theft event. |
| Dispute On File (CRA corrections database) | Applicant has disputed the accuracy of some of the information maintained by a private database. Unable to verify the dispute was valid and, therefore, did not make any changes to the content. The consumer has requested a statement be placed on their file disputing the accuracy of the information. |
| Subject has opted out of prescreen offers | A consumer may choose to be removed from prescreen offers and add themselves to the prescreen opt-out list. |
| Criminal record found | Criminal conviction history found |
| Lien/Judgment record found | Public record of a lien or judgment filed |
| The input address is verified but may not be primary residence | Input address is associated with subject, but may not be their primary residence |
| No evidence of property ownership | No evidence of current or historical property ownership |
| Evidence of historical property ownership but no current record | No evidence of current property ownership, but evidence of historical ownership |
| Length of residence | Time at current address is short |
| Change of address frequency | Too many address changes on file |
| Number of sources confirming identity and current address | Too few sources in public record consumer file documenting current address |
| Date of confirming source update | No recorded updates within the past 24 months |
| Insufficient Age | Applicant lost points because age was ≤23 years |
| Evidence of sub prime credit services solicited | Applicant has solicited offers for sub-prime credit services |
| No evidence of post-secondary education | No record of education beyond high school for applicant |
| Age of oldest public record on file | Time since first seen in public records is <14 months |

TABLE 1-continued

| Fraud Characteristics | Description |
| --- | --- |
| Address dwelling type | Applicant's dwelling type is not a single family dwelling unit |
| Distance between the current and previous address | The distance between the current and previous address is too far |
| Insufficient evidence of wealth | Lack of evidence of wealth on file for applicant |
| Correctional address in address history | The applicant has an address associated with a correctional facility in their address history |
| No evidence of phone service at address | No evidence of phone service at the applicant's address |
| Number of consumer finance inquiries | Number of consumer finance inquiries |
| Number of inquiries in the last 12 months | Number of inquiries in the last 12 months |
| Length of time on sources confirming identity | Length of time on the sources confirming identity is too short |
| Type of mortgage | Applicant has an adjustable rate mortgage listed on public records |
| Input phone is invalid, non-residential or disconnected | Input phone is invalid, non-residential or disconnected |
| Input address invalid, non-residential or undeliverable | Input address invalid, non-residential or undeliverable |
| Input SSN is invalid, recently issued, or inconsistent with date of birth | Input SSN is invalid, recently issued, or inconsistent with date of birth |
| Bankruptcy record on file | Bankruptcy record on file |
| Insufficient information on file | Insufficient data available on file to generate a score. Any transaction subject to insufficient data available on file to generate a score may return an exception score. |
| Eviction record found | Unlawful detainer/eviction judgment filed against the consumer |
| Multiple identities associated with input SSN | Input SSN is associated with multiple different individuals |
| The input SSN was issued within the last seventeen years | SSN issued within past 17 years |
| Multiple SSNs reported with applicant | Consumer is associated with multiple SSNs from multiple records |
| Insufficient Property Value | Estimated current market value of applicant's real property is too low |

In accordance with certain example implementations of the disclosed technology, the applicant- or subject-supplied initial set of identifying information (such as personal information) may be analyzed to determine if such information corresponds to conditions that indicate high identity fraud risk. For example, a social security number (SSN) can be checked to determine if it is valid or not. An invalid SSN, a SSN supplied by the applicant that corresponds to a person who has been reported as deceased, an SSN issued prior to the applicant's date-of-birth; and/or a SSN used by multiple different identities would all be indicators of high identity fraud risk. Another indicator of high identity fraud risk includes multiple suspicious identities at the applicant's address.

According to example implementations, the applicant's residential address history may be taken into account for determining identity fraud risk. For example, the length of residence at one or more addresses, the number of address moves, and/or the number of utility connects and disconnects may be indicators of identity fraud.

According to example implementations, certain technical effects can be provided, such as creating certain systems and methods that may reduce fraud losses, reduce false positives and improve operational efficiency. Example implementations of the disclosed technology can provide the further technical effects of providing systems and methods for detecting identity fraud, and providing information regarding the type of identity fraud. Certain implementations of the disclosed technology may further provide the technical effects of authenticating a subject's identity via a staged authentication process wherein initiation of a particular stage may rely on successful completion of a previous stage.

In example implementations of the disclosed technology, the multi-stage identity authentication process 100 may be implemented using any number of hardware and/or software applications that are executed to facilitate any of the operations. In example implementations, one or more I/O interfaces may facilitate communication between the multi-stage identity authentication system 200 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the multi-stage identity authentication system 200. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the multi-stage identity authentication system 200 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, implementations of the disclosed technology may include the multi-stage identity authentication system 200 with more or less of the components illustrated in FIG. 2 or FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
receiving a set of identity information associated with a subject;
querying one or more public or private databases with at least a portion of the set of identity information;
receiving, in response to the querying, independent information;
determining, with one or more computer processors, and based at least in part on a comparison of the independent information with at least a portion of the set of identity information, zero or more first indicators of fraud risk;
responsive to the determining of the zero or more first indicators of fraud risk, producing, with the one or more computer processors, one or more identity proofing queries, wherein at least a portion of the one or more identity proofing queries is based on identity information derived from the independent information;
receiving, in response to sending the one or more identity proofing queries, at least one query response;
determining, with the one or more computer processors, and based at least in part on a comparison of the one or more proofing queries and the at least one query response, zero or more second indicators of fraud risk;
evaluating a fraud score, based at least in part on zero or more of the first and second indicators of fraud risk; and
responsive to evaluating the fraud score, initiating one or more of authentication enrollment of the subject and multi-factor authentication of the subject.

2. The method of claim 1, wherein receiving the set of identity information comprises receiving, as applicable, one or more of: a phone number, an IP address, a location, and a communication device electronic fingerprint.

3. The method of claim 1, wherein receiving the set of identity information comprises receiving, as applicable, one or more of: a name, an address, a birth date, a phone number, and at least portion of a social security number.

4. The method of claim 1, further comprising outputting an indication of the fraud score.

5. The method of claim 1, wherein multi-factor authentication of the subject comprises one or more of knowledge based authentication (KBA) and a one-time passcode (OTP) authentication.

6. The method of claim 1, further comprising capturing biometric information, wherein capturing biometric information comprises one or more of: fingerprint image capture, voiceprint audio capture, facial feature image capture, and iris image capture.

7. The method of claim 1, wherein evaluating the fraud score comprises differentiating between normal, low risk, and high fraud risk.

8. The method of claim 1, wherein evaluating the fraud score comprises evaluating the set of identity information and the independent information for one or more of social security number validation, address validation, characteristics of the address, issuance characteristics of the social security number, correlation of one or more individual identity elements associated with the set of identity information and the independent information in one or more consumer identity data repositories, velocity of the appearance of an identity in account opening searches, divergence between the one or more identity elements in account opening searches, history of the identity in the one or more consumer identity data repositories, sources reporting the identity, associates and relatives of the identity, variation of the one or more identity elements reported, and verification of application identity as an existing identity known from consumer identity data repositories.

9. A system comprising:
at least one memory for storing data and computer-executable instructions; and at least one processor configured to access the at least one memory and further configured to execute the computer-executable instructions to:
receive a set of identity information associated with a subject;
query one or more public or private databases with at least a portion of the set of identity information;
receive, in response to the querying, independent information;
determining, with the at least one processor, and based at least in part on a comparison of the independent information with at least a portion of the set of identity information, zero or more first indicators of fraud risk;
responsive to the determining of the zero or more first indicators of fraud risk, produce, with the at least one processor, one or more identity proofing queries, wherein at least a portion of the one or more identity proofing queries is based on identity information derived from the independent information;
receive, in response to sending the one or more identity proofing queries, at least one query response;
determine, with the at least one processor, and based at least in part on a comparison of the one or more proofing queries and the at least one query response, zero or more second indicators of fraud risk;
evaluate a fraud score, based at least in part on zero or more of the first and second indicators of fraud risk; and
responsive to evaluating the fraud score, initiate one or more of authentication enrollment of the subject and multi-factor authentication of the subject.

10. The system of claim 9, wherein the identity information comprises, as applicable, one or more of: a phone number, an IP address, a location, and a communication device electronic fingerprint.

11. The system of claim 9, wherein the set of identity information comprises, as applicable, one or more of: a name, an address, a birth date, a phone number, and at least portion of a social security number.

12. The system of claim 9, wherein multifactor authentication comprises one or more of knowledge based authentication (KBA) and one-time passcode (OTP) authentication.

13. The system of claim 9, wherein the at least one processor is further configured to access the at least one memory and further configured to execute the computer-executable instructions to capture subject biometric information.

14. The system of claim 9, wherein the fraud score is based on an evaluation of the set of identity information and the independent information for one or more of social security number validation, address validation, characteristics of the address, issuance characteristics of the social security number, correlation of one or more individual identity elements associated with the set of identity information and the independent information in one or more consumer identity data repositories, velocity of the appearance of an identity in account opening searches, divergence between the one or more identity elements in account opening searches, history of the identity in the one or more consumer identity data repositories, sources reporting the identity, associates and relatives of the identity, variation of the one or more identity elements reported, and verification of application identity as an existing identity known from consumer identity data repositories.

15. One or more non-transitory computer readable media comprising computer-executable instructions that, when executed by one or more processors, cause the one or more processors to perform a method comprising:
receiving a set of identity information associated with a subject;
querying one or more public or private databases with at least a portion of the set of identity information;
receiving, in response to the querying, independent information;
determining, with one or more computer processors, and based at least in part on a comparison of the independent information with at least a portion of the set of identity information, zero or more first indicators of fraud risk;
responsive to the determining of the zero or more first indicators of fraud risk, producing, with the one or more computer processors, one or more identity proofing queries, wherein at least a portion of the one or more identity proofing queries is based on identity information derived from the independent information;
receiving, in response to sending the one or more identity proofing queries, at least one query response;
determine, with the one or more computer processors, and based at least in part on a comparison of the one or more proofing queries and the at least one query response, zero or more second indicators of fraud risk;
evaluating a fraud score, based at least in part on zero or more of the first and second indicators of fraud risk; and
responsive to evaluating the fraud score, initiating one or more of authentication enrollment of the subject and multi-factor authentication of the subject.

16. The non-transitory computer readable media of claim 15, wherein receiving the set of identity information comprises receiving, as applicable, one or more of: a phone number, an IP address, a location, and a communication device electronic fingerprint.

17. The non-transitory computer readable media of claim 15, wherein receiving the set of identity information comprises receiving, as applicable, one or more of: a name, an address, a birth date, a phone number, and at least portion of a social security number.

18. The non-transitory computer readable media of claim 15, wherein multi-factor authentication comprises one or more of: knowledge based authentication (KBA) and one-time passcode (OTP) authentication.

19. The non-transitory computer readable media of claim 15, further comprising capturing biometric information, wherein capturing biometric information comprises one or more of: fingerprint image capture, voiceprint audio capture, facial feature image capture, and iris image capture.

20. The non-transitory computer readable media of claim 15, wherein evaluating the fraud score comprises evaluating the set of identity information and the independent information for one or more of social security number validation, address validation, characteristics of the address, issuance characteristics of the social security number, correlation of one or more individual identity elements associated with the set of identity information and the independent information in one or more consumer identity data repositories, velocity of the appearance of an identity in account opening searches, divergence between the one or more identity elements in account opening searches, history of the identity in the one or more consumer identity data repositories, sources reporting the identity, associates and relatives of the identity, variation of the one or more identity elements reported, and verification of application identity as an existing identity known from consumer identity data repositories.

\* \* \* \* \*